(12) United States Patent
Stahl (10) Patent No.: US 7,804,815 B1
(45) Date of Patent: Sep. 28, 2010

(54) SYSTEM AND APPARATUS FOR TELECOMMUNICATION

(75) Inventor: Karl Erik Stahl, Värmdö (SE)

(73) Assignee: Intertex Data AB, Varmdo (SE)

( * ) Notice: Subject to any disclaimer, the term of this patent is extended or adjusted under 35 U.S.C. 154(b) by 0 days.

(21) Appl. No.: 09/397,959

(22) Filed: Sep. 17, 1999

(51) Int. Cl.
*H04L 12/66* (2006.01)

(52) U.S. Cl. ...................... 370/352; 370/401

(58) Field of Classification Search ......... 370/351–356, 370/400, 401, 463, 419, 420; 379/272, 273, 379/220.01, 221.01, 93.09
See application file for complete search history.

(56) References Cited

U.S. PATENT DOCUMENTS

| | | | |
|---|---|---|---|
| 5,097,528 A | 3/1992 | Gursahaney et al. | |
| 5,408,519 A | 4/1995 | Pierce et al. | |
| 5,440,615 A | 8/1995 | Caccuro et al. | |
| 5,530,740 A | 6/1996 | Irribarren et al. | |
| 5,537,461 A | 7/1996 | Bridges et al. | |
| 5,608,786 A | 3/1997 | Gordon | |
| 5,629,978 A | 5/1997 | Blumhardt et al. | |
| 5,631,745 A | 5/1997 | Wong et al. | |
| 5,636,218 A | 6/1997 | Ishikawa et al. | |
| 5,664,010 A | 9/1997 | Walker et al. | |
| 5,680,552 A | 10/1997 | Netravali et al. | |
| 5,740,231 A | 4/1998 | Cohn et al. | |
| 5,742,596 A * | 4/1998 | Baratz | 370/356 |
| 5,742,670 A | 4/1998 | Bennett | |
| 5,751,706 A | 5/1998 | Land et al. | |
| 5,799,016 A | 8/1998 | Onweller | |
| 5,815,553 A | 9/1998 | Baugh et al. | |
| 5,995,606 A * | 11/1999 | Civanlar et al. | 379/201 |
| 6,064,653 A * | 5/2000 | Farris | 370/237 |
| 6,075,783 A * | 6/2000 | Voit | 370/352 |
| 6,091,721 A | 7/2000 | Greenberg et al. | |
| 6,185,288 B1 * | 2/2001 | Wong | 379/219 |
| 6,208,639 B1 * | 3/2001 | Murai | 370/356 |
| 6,229,804 B1 * | 5/2001 | Mortsolf et al. | 370/352 |
| 6,243,376 B1 * | 6/2001 | Ng et al. | 370/352 |
| 6,243,377 B1 * | 6/2001 | Phillips et al. | 370/354 |
| 6,259,691 B1 * | 7/2001 | Naudus | 370/352 |
| 6,295,293 B1 * | 9/2001 | Tonnby et al. | 370/389 |
| 6,353,610 B1 * | 3/2002 | Bhattacharya et al. | 370/352 |
| 6,370,149 B1 * | 4/2002 | Gorman et al. | 370/419 |

(Continued)

FOREIGN PATENT DOCUMENTS

EP  0789470 A2  8/1997

(Continued)

OTHER PUBLICATIONS

Japanese Patent Office Action, dated Aug. 4, 2009.

(Continued)

*Primary Examiner*—Pankaj Kumar
*Assistant Examiner*—Duc T Duong (57) ABSTRACT

A system for IP telephony that utilizes distributed gateways instead of centralized gateways for communication between IP Telephones on a Packet Based Digital Network (PBDN) and Telephones on a Public Switched Telephone Network (PSTN). The system is based on the use of IP Telephone apparatuses ("Gateway Telephones") wherein each is connected both to the PBDN and a PSTN and includes a built-in gateway between the two network connections. The gateway capacity of the system thus increases automatically with the number of Gateway Telephones. Gateway Location Servers facilitate the selection of a Gateway Telephone to serve as a gateway for a specific telephone call.

17 Claims, 3 Drawing Sheets

U.S. PATENT DOCUMENTS

| | | | |
|---|---|---|---|
| 6,404,764 B1 * | 6/2002 | Jones et al. | 370/352 |
| 6,449,259 B1 * | 9/2002 | Allain et al. | 370/253 |
| 6,463,051 B1 * | 10/2002 | Ford | 370/352 |
| 6,650,619 B1 * | 11/2003 | Schuster et al. | 370/230 |
| 6,674,745 B1 * | 1/2004 | Schuster et al. | 370/352 |
| 6,711,160 B2 * | 3/2004 | Chan et al. | 370/354 |
| 6,934,258 B1 * | 8/2005 | Smith et al. | 370/238 |
| 6,944,151 B1 | 9/2005 | Ménard | |
| 6,954,454 B1 * | 10/2005 | Schuster et al. | 370/352 |
| 7,280,530 B2 * | 10/2007 | Chang et al. | 370/352 |

FOREIGN PATENT DOCUMENTS

| | | |
|---|---|---|
| EP | 0 939 522 A1 | 9/1999 |
| EP | 0789470 A3 | 9/2002 |
| GB | 2 283 154 A | 4/1995 |
| JP | 2-295329 | 12/1990 |
| JP | 07-307789 | 11/1995 |
| JP | 09-191324 | 7/1997 |
| JP | 10-233808 | 9/1998 |
| JP | 10-271243 | 10/1998 |
| JP | 2001-517032 | 10/2001 |
| WO | WO 98/30007 | 7/1988 |
| WO | WO 97/23078 | 6/1997 |
| WO | WO98/11704 * | 3/1998 |
| WO | WO 98/36543 | 8/1998 |

OTHER PUBLICATIONS

Japanese Office Action issued Jul. 6, 2010 in corresponding Patent Application 2001-524343.

* cited by examiner

SYSTEM AND APPARATUS FOR TELECOMMUNICATION

BACKGROUND OF THE INVENTION

The present invention relates to telecommunication systems, and specifically to telephony via a combination of circuit switched public telephone systems and packet based digital systems.

Telephony, which means "remote sound transmission" has been available for about a century. Public companies, usually regulated and taxed by government agencies, provide wiring to telephone customers, who lease or own a Telephone, and provide switching equipment allowing any pair of Telephones to be connected together for communication. A Telephone includes a microphone and a small loudspeaker, plus a keypad or a rotary dial for specifying which second Telephone the customer wants to be connected to. The global network for this type of telephony is known as the Public Switched Telephone Network ("PSTN"). Lately, PSTN has been expanded to carry facsimile messages and other digital information, and transmission may in part be via digital signals instead of analog, but the network is still circuit switched, which is characterized by continuous point to point communication between end users.

Cellular telephony is a variant of PSTN. Communication between a Cellular Telephone and the network is wireless, and may be analog or digital, but inside current networks circuit switching is used for connections.

The Internet is a Packet Based Digital Network ("PBDN"), which offers high capacity and low cost transmission of digital information. In the mid 1990's, enthusiasts started making voice connections between computers connected to the Internet, using microphones and loudspeakers connected to the computers, and software to make the computers converting a voice stream into digital packets transmitted over the Internet and back into a voice stream. This was the first form of what is called Internet Protocol telephony ("IP telephony"). Software for telephony via computers on the Internet is readily available today. This type of voice connection can, however, only be used between computers that are connected to the Internet before the voice connection is set up.

Another form of IP telephony is used for toll bypass, i.e. to reduce the cost of long distance calls. There are numerous providers offering reduced long distance rates by routing the long distance portion of a call over the Internet. Network Gateways are used as intermediaries between a PSTN and a PBDN at both the calling end and the receiving end of the connection. A customer uses an ordinary Telephone, but dials via a suitably located Network Gateway, which packetizes the voice signal and transmits the voice data packets via the Internet to another Network Gateway close to the called party. There the packetized voice data are converted back to voice signals for the PSTN. This type of IP telephony requires a rather cumbersome dialing sequence, and the voice quality may be inferior to circuit switched analog telephony, but the cost is lower than for ordinary long distance calls.

U.S. Pat. No. 5,751,706 issued to Land et al. gives a comprehensive description of the present state of the art of telephony gateways between PBDN and PSTN.

Standards for IP telephony, such as H.323 from the International Telecommunication Union ("ITU") and Session Initialization Protocol ("SIP") from the Internet Engineering Task Force ("IETF"), are under development. Early versions have been defined and continued work is in progress. However, current IP telephony equipment, both end user equipment and gateways, currently show poor compatibility. Future improved standards and better compliance will hopefully remedy this problem.

The lack of compatibility, and also limited cooperation between IP telephony service providers, have often forced providers to have their own Network Gateways at both ends of a call connection. Known systems for IP telephony are thus often limited to communications between initiators and receivers using Network Gateways operated by a specific IP telephony provider. A single Network Gateway can handle only a limited number of simultaneous telephone calls, so prior art IP telephony systems are limited by the investment in Network Gateways, both in its geographic coverage, and in its capacity in each geographic area.

The next step in the evolution of IP telephony will utilize new technologies for fixed high speed Internet connections, such as cable modem or Digital Subscriber Line ("DSL") connections. These technologies will spur the development of special IP telephony apparatuses ("IP Telephones"), which will remain connected to the Internet at all times. A telephone connection between two compatible IP Telephones will be via packetized digital voice data directly over the Internet. Network Gateways are thus not required for direct connections, but calls between an IP Telephone and a Telephone connected to a PSTN will require a Network Gateway located close to the called Telephone. The Network Gateway and the IP Telephone must use the same IP telephony standard and be compatible. This known system for IP telephony thus suffers from the same limitations as any system based on Network Gateways when the IP Telephones are used for connections with ordinary Telephones connected to a PSTN.

SUMMARY OF THE INVENTION

It is a main object of the present invention to provide a system for all purpose IP telephony which does not require Network Gateways in the system.

It is a further object of the present invention to provide an IP telephony network based on a system of distributed gateways, which are included in IP telephone apparatuses for receiving and initiating calls by users of the system, so the capacity of the system will grow automatically with the number of users.

It is a still further object of the present invention to provide a telecommunication apparatus for initiating and receiving voice and data calls, which includes a gateway between circuit switched and packet based telecommunication networks.

These objects are achieved by a system for telecommunication, which includes multiple telecommunication apparatuses adapted to initiate and receive calls, where each telecommunication apparatus includes a first port to connect the telecommunication apparatus to a circuit switched telecommunication network, a second port to connect the telecommunication apparatus to a packet based telecommunication network, and gateway means for establishing a path between the first port and the second port inside the telecommunication apparatus in response to a request imbedded in an incoming call request from the packet based telecommunication network, whereby the telecommunication apparatuses can serve as part of a distributed gateway system between the two networks.

In the description below, the term "Gateway Telephone" is used to describe a telecommunication apparatus for use in a system for telecommunication according to the invention.

Additional objects and advantages of the invention will be set forth in part in the description which follows, and, in part, will be obvious from the description, or may be learned by practice of the invention.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF PREFERRED EMBODIMENTS

Reference will now be made in detail to preferred embodiments of the invention, examples of which are illustrated in the accompanying drawings.

Figure 1:
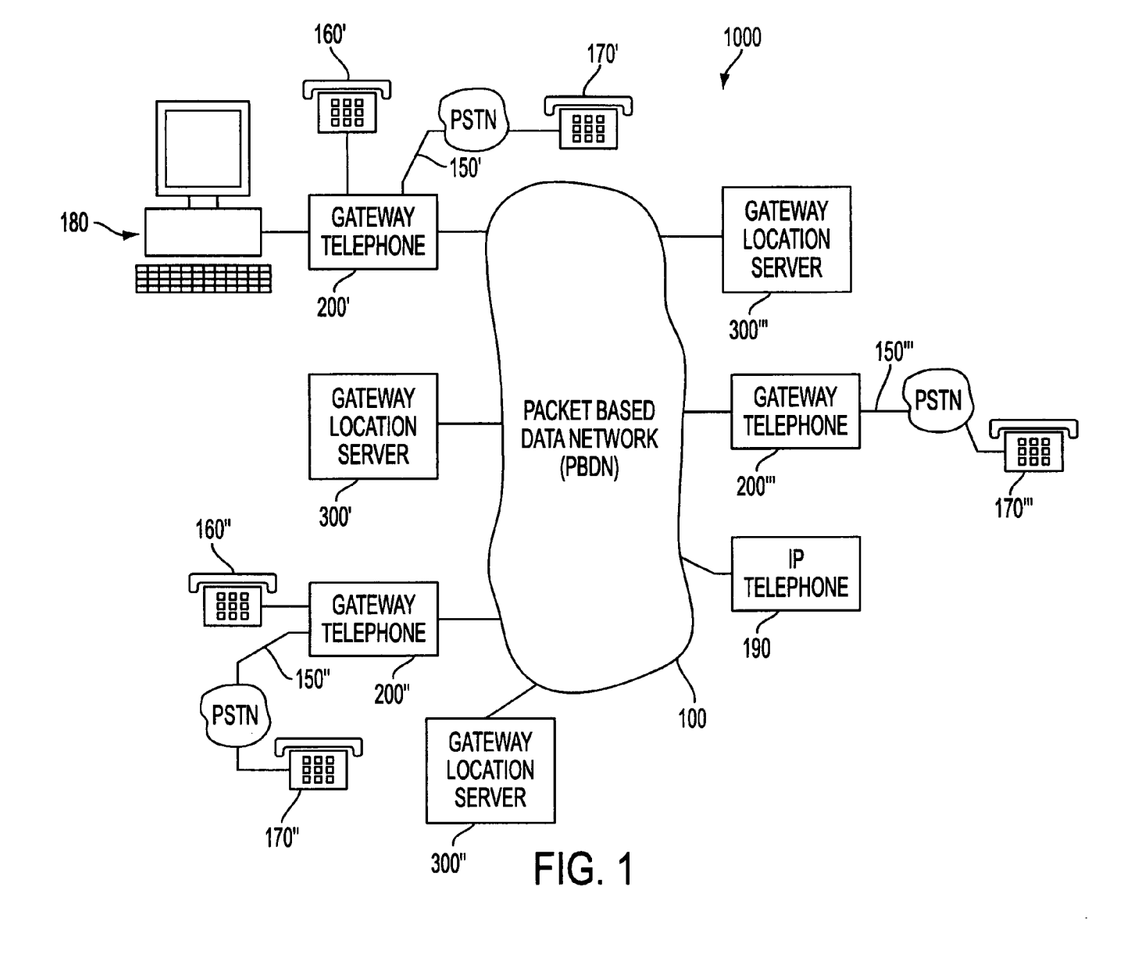
FIG. 1 is a block diagram for a telecommunication system according to a preferred embodiment of the invention.

FIG. 1 is a block diagram showing a telecommunication system 1000 in schematic form according to a preferred embodiment of the invention. A number of Gateway Telephones 200, such as 200', 200'', 200''', are connected to a Packet Based Digital Network ("PBDN") 100, such as the Internet. Ordinary IP Telephones 190 may also be connected to the same PBDN 100. Gateway Location Servers 300', 300'' belonging to the telecommunication system 1000 are also connected to the PBDN. Each Gateway Telephone 200', 200'', 200''' is also connected to a Public Switched Telephone Network ("PSTN") via respective telephone lines 150', 150'', 150'' and is a subscriber to its respective PSTN. Gateway paths in each Gateway Telephone 200', 200'', 200''' according to the preferred embodiment of the invention make communication possible between the PBDN and the PSTN.

When a user of a Gateway Telephone 200', which may be based in Boston, Mass., USA, wants to place a long distance call to another Gateway Telephone 200'', which may be located in Stockholm, Sweden, the user keys in the digital address, e.g. "johan.lind@lindware.se" on his Gateway Telephone 200' keypad, or he may use a short code to input the digital address from an address memory in his Gateway Telephone 200'. The digital address is the address to the called IP Telephone from the PBDN side and complies with the IP telephony standard used. If the IP telephony standard SIP is used, the digital address will look similar to an email address, as shown above.

Software and hardware in the calling Gateway Telephone 200' resolves the actual IP address by a Domain Name Service ("DNS") lookup, or by sending the request to a proxy server on the Internet, which does the IP address resolution. DNS look-ups and proxy servers are common parts of the Internet. The call set-up request is then passed to the dialed Gateway Telephone 200'' directly or via one or more proxy servers in the Internet network. If the dialed Gateway Telephone 200'' is available, it will confirm the call set-up, and a data stream containing digital voice packets will be set up directly or via one or several proxy servers in the Internet.

This is the same process for Internet based calls used by any IP Telephone 190 now being contemplated. A Gateway Telephone 200 acts as any other IP Telephone 190 as long as calls are made between Internet based apparatuses, and calls may be made from a Gateway Telephone 200' to any other IP Telephone 190 connected to the Internet, and vice versa, as long as the IP Telephone 190 uses the same IP telephony standard as the Gateway Telephone 200.

The preferred embodiments of the present invention make it possible for a Gateway Telephone 200 to also make telephone calls via the Internet to parties who only have PSTN Telephones 170, without relying on Network Gateways in the network. A user of a Gateway Telephone 200' may, for instance, want to call a PSTN subscriber in Stockholm, Sweden who has a Telephone 170''', but is not connected to the Internet. An unrelated Gateway Telephone 200''' registered as an Intermediary Gateway Telephone, located in Stockholm, Sweden, would then be asked to call the desired party at PSTN Telephone 170''' on the local PSTN via its line 150''' to set up a PSTN telephone connection. If the PSTN Telephone 170''' responds by being taken off hook, the call will be accepted, and software and hardware in the Intermediary Gateway Telephone 200''' will complete the connection, using its built-in gateway path to connect the PBDN to the PSTN.

Every Gateway Telephone 200 according to preferred embodiments of the invention includes a gateway between the PBDN and the PSTN it is connected to, and all Gateway Telephones are functionally interchangeable, so any of them could serve as an Intermediary Gateway Telephone 200 for calls to PSTN telephones 170. In practice, many users will not want third party traffic via their Gateway Telephones 200, and some users may also be excluded for confidentiality reasons. Only a few percent of the users will accordingly have their Gateway Telephone 200 registered as an Intermediary Gateway Telephone. When a Gateway Telephone 200 is registered as an Intermediary Gateway Telephone, its digital address will automatically be listed in a Gateway Location Server 300. The Gateway Location Server 300 will also be notified automatically when the PSTN interface in a registered Intermediary Gateway Telephone 200 is busy ("off hook"), which makes it temporarily unavailable as an Intermediary Gateway Telephone.

The selection of an Intermediary Gateway Telephone 200''' and the request for connection to a PSTN telephone number are made automatically by dialing software in the calling Gateway Telephone 200'. The caller just enters the country code, area code, and telephone number for the called PSTN Telephone 170''' on the keyboard of his Gateway Telephone 200', e.g. "+46-8-12345678" for a call to Stockholm, Sweden. He may also enter it from memory by dialing a short code if it is a frequently used number. The dialing software in the Gateway Telephone 200' recognizes this as a PSTN number, and forwards the call set-up request to a Gateway Location Server 300. To find the Gateway Location Server 300' closest to the party to be called, the Gateway Telephone 200' may form an Internet domain address including the country code or country plus area code (for example, "sip46.pstngw.com" for a Gateway Location Server in Sweden). A DNS look up can then return the actual IP address to the Gateway Location Server 300''', to which the calling Gateway Telephone 200' sends the request for the call set up. The Gateway Location Server 300''' forwards the call set-up request, which includes the PSTN telephone number, to a registered Intermediary Gateway Telephone 200''' close to the called party. The Intermediary Gateway Telephone 200' then dials the requested telephone number on its PSTN line 150''' to set up a connection with the caller at Gateway Telephone 200' on the PBDN side. A path for a media stream (typically for voice) is created inside the Intermediary Gateway Telephone 200'' between the caller at Gateway Telephone 200' on the PBDN side and the called party at Telephone 170''' on the PSTN side. The Intermediary Gateway Telephone 200" converts the digital voice packets from the PBDN side to analog voice signals for the PSTN side, and vice versa.

Note that the Gateway Location Server 300" is not connected to a PSTN, so it is not a Network Gateway, and it does not have to pass the communication data stream for the telephone call. No central Network Gateway is required. The Gateway Location Server 300''' facilitates the call set-up, and also maintains contact with the Intermediary Gateway Telephone 200''' for the duration of the call, so it can collect data for billing of the calling party at Gateway Telephone 200' for the long distance call and for reimbursement to the Intermediary Gateway Telephone 200" for its service as an Intermediary. As is common on the Internet, the call set-up and media stream may pass one or several proxy servers between the calling Gateway Telephone 200' and the Intermediary Gateway Telephone 200'''. The calling Gateway Telephone 200' does not have to be registered as an Intermediary Gateway Telephone, but can be any IP Telephone 190 conforming to the protocol used for connecting via an Intermediary Gateway Telephone.

In a preferred embodiment of the invention, the Gateway Telephone 200 is also capable of receiving incoming telephone calls on its PSTN line 150. A potential customer for the Gateway Telephone 200 can be assumed to already have a PSTN line 150 and a telephone 170. The Gateway Telephone 200 can then be used for receiving telephone calls from callers on the PSTN using the customer's already existing old telephone number.

In another preferred embodiment of the invention, a normal PSTN Telephone 160 is also connected directly to the Gateway Telephone 200. The Telephone 160 can serve as a handset device for the Gateway Telephone 200, but more importantly, it can serve as a back up device, capable of placing or receiving calls over the PSTN. For such purpose, the Gateway Telephone 200 must assure that the Telephone 160 is directly connected to the PSTN line 150 (e.g., via a relay) whenever the Gateway Telephone 200 or the IP telephony system is out of order.

In a further preferred embodiment of the invention, the Gateway Telephone 200 is also capable of automatically selecting whether it is more economical to place a call to a PSTN telephone 170 over the PBDN or directly over the PSTN via its PSTN line 150. For a local call, it is normally more economical to go via the PSTN line 150.

In a still further preferred embodiment of the invention, the Gateway Location Servers 300 are also used to optimize call routing to PSTN telephone numbers now having a Gateway Telephone 200. If the Gateway Location Servers 300 register the PSTN telephone numbers for the registered Intermediary Gateway Telephones 200, then—when receiving a request for a PSTN connection—the Gateway Location Server 300 can detect that the requested PSTN telephone is available via the PBDN and place the call directly to the Gateway Telephone 200 via the PBDN without passing the PSTN. As a consequence, registered users will be able to receive telephone calls on their Gateway Telephones 200 via the PBDN even when the calls are initiated using their PSTN telephone number instead of the digital address. This is an advantage during a transfer period when the digital address of the Gateway Telephone 200 may not be known to potential callers. This service may be extended to also include users having other IP Telephones 190 and a PSTN telephone number. Such users can also be registered by the Gateway Location Server 300 so that calls to such registered PSTN Telephone number can be directly routed to their IP Telephone instead of being routed over the PSTN.

Figure 2:
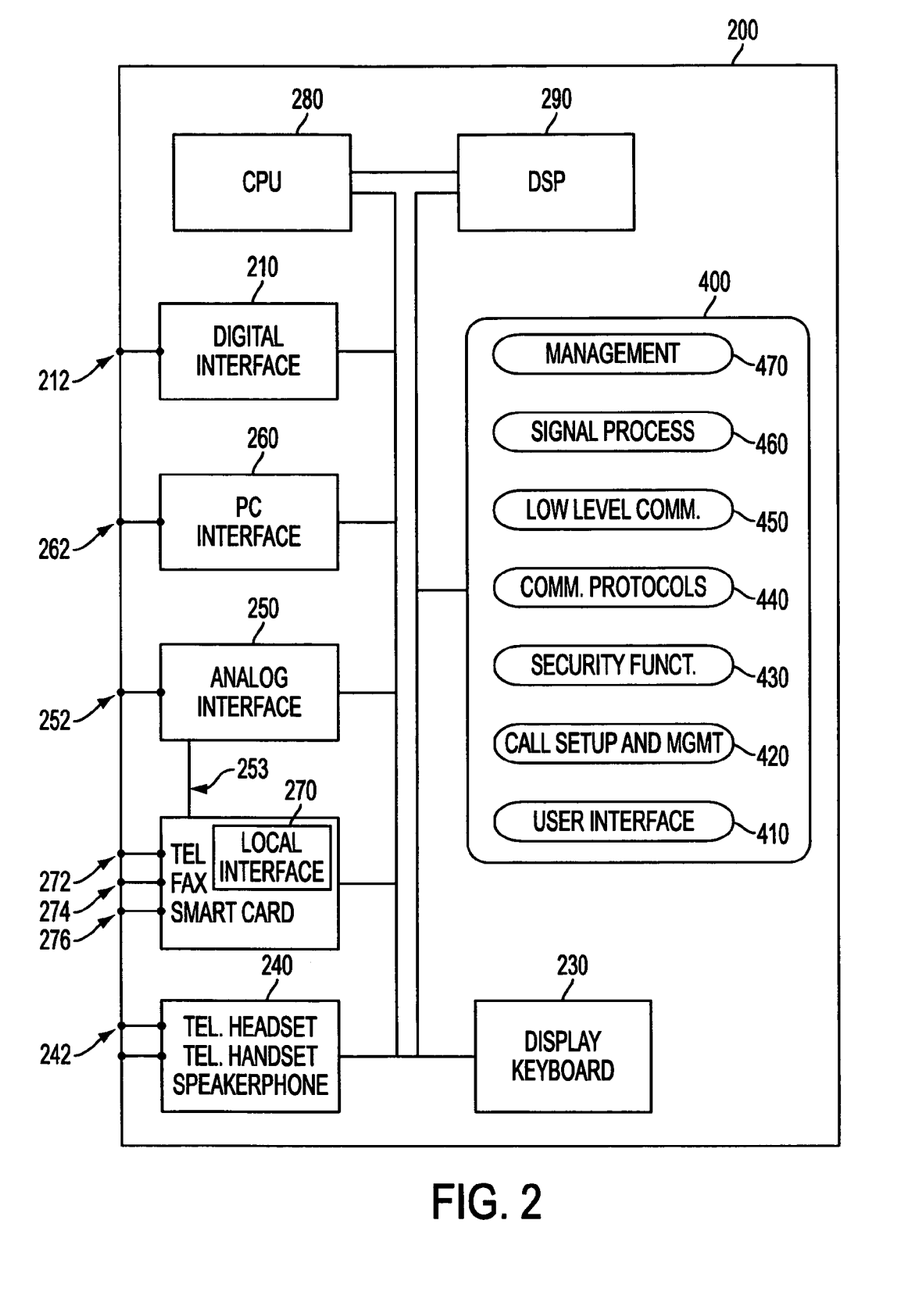
FIG. 2 is a block diagram for a Gateway Telephone according to a preferred embodiment of the invention for use in the telecommunication system shown in FIG. 1.
Figure 3:
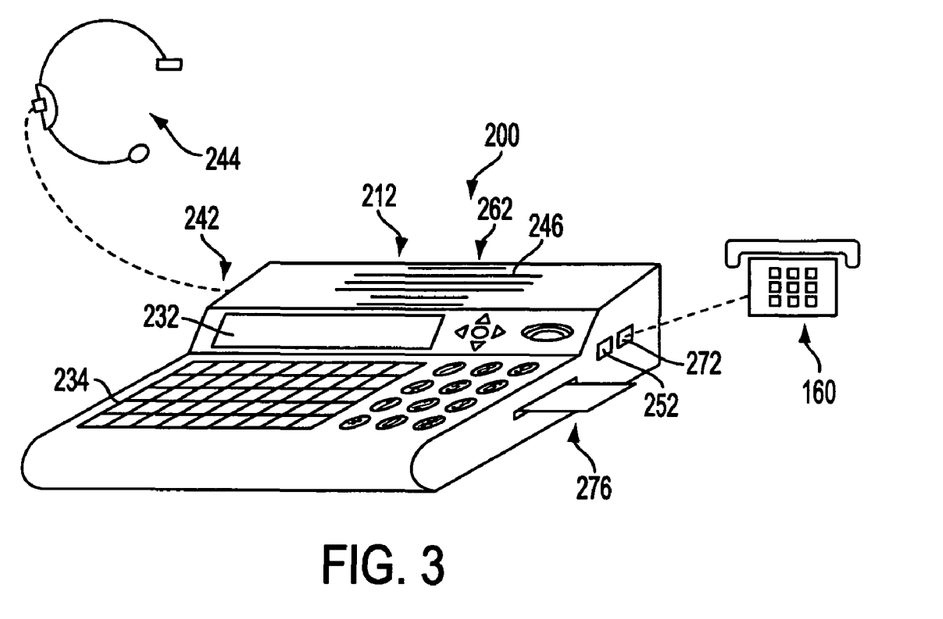
FIG. 3 is a prospective view of a Gateway Telephone according to the embodiment of FIG. 2.

A Gateway Telephone 200 according to a preferred embodiment of the invention will be described below with reference to FIGS. 2 and 3. FIG. 2 is a block diagram for the Gateway Telephone 200, and FIG. 3 is a prospective view of it.

The Gateway Telephone 200 is built up from commercially available hardware components, controlled by mostly conventional software. The hardware includes major interface components, such as a Digital Interface 210 with a port 212 for connection to a PBDN 100, e.g. the Internet or a Local Area Network ("LAN"), and an Analog Interface 250 with a port 252 for connection to a PSTN line 150. Usually, but not necessarily, the hardware will also include PC interface components 260 with a port 262 for connection of a Personal Computer 180 (FIG. 1), and interface components 270 with a port 272 for connection of an external PSTN Telephone 160. A circuit connection 253, controlled by a power sensing device (e.g., a relay), may also be included so ports 252 and 272 can be interconnected automatically if the Gateway Telephone 200 loses power. A port 274 for a Facsimile machine and/or an Answering machine, as well as a port 276 for a SmartCard reader may also be included.

The hardware also includes user interface components 230, such as a display panel 232 and a keyboard 234, as well as built-in audio components 240, such as a handset (not shown), and/or a headset 244, and a speaker phone 246.

Finally there are a Central Processing Unit ("CPU") 280 with memory and logic components, and a Digital Signal Processor ("DSP") 290. The functions of the DSP 290 can also be performed by the CPU 280, if the CPU 280 is powerful enough.

The digital interface 210 may be either an Ethernet Connection, or a Cable Modem, or a DSL Modem, or several of these may be included for versatility. Other interfaces for fixed connection to a PBDN are also possible.

The analog interface 250 adapts the analog signals between the PSTN port 252 and the DSP 290, executes the line seizure, dialing, and detects incoming ring signals. DSL connections carry both the analog PSTN transmission and the digital PBDN connection over the same cable, but that makes no functional difference to embodiments of the invention. For certain forms of DSL connections (the splitter-less type), the Digital Interface 210 and the Analog Interface 250 are directly connected to the same cable.

The user interface components 230 include an LCD panel 232 for display of addresses and messages from management software 470 as noted below, as well as an alpha-numeric keyboard 234, possibly with function keys for rapid input of certain commands.

The audio components 240 include a speaker phone 246 and a telephone handset (not shown), or rely on an external Telephone 160 connected to port 272 for the local interface 270 to allow voice communication. A port 242 is also included for a headset 244, which is a handy device, even if it is not required.

Except for the analog PSTN interface 250, which may already be included for other reasons, the gateway function built into each Gateway Telephone apparatus 200 does not require any separate hardware. The voice and data stream path between the PBDN port 212 and the PSTN port 252 is opened and controlled by software executed in the CPU 280 and the DSP 290. The conversion of analog data into digital packets and digital packets into analog data is also performed by the CPU 280 and the DSP 290 under software control.

Software 400, which is stored in non-volatile memory units, includes conventional software for control of user interfaces 410, for security functions 430, for communication protocols 440, for low level communication 450, and for signal processing 460. Additional software handles call set-up and management 420 and the overall management 470 of the Gateway Telephone 200.

The user interface software 410 controls the display panel 232, signals from the keyboard 234, the PC command interface 260, and address lists stored in memory.

The call set-up and management software 420, as well as the software for control of the overall distributed gateway system, follow the standards for IP Telephony, number plans, authentication, billing, and other related areas set by the IETF and the ITU. Only minor extensions and additions to existing standardized protocols are required to realize the distributed gateway system according to the embodiments of the invention.

The software supporting the path for the media stream between the interface for the PBDN and the interface for the PSTN is basically the same software that is used in any ordinary IP Telephone 190 to handle the media stream between the PBDN interface 210 and an interface 240 to an analog voice device, e.g. a telephone handset. Allowing such software to instead handle the media stream between the Digital Interface 210 to the PBDN and the Analog Interface 250 to the PSTN makes it perform the function required for the gateway path in the Gateway Telephone 200. Since it is advantageous that the Gateway Telephone 200 can be used for IP Telephony by its owner even while it is acting as an Intermediary Gateway for a third party call, such as described earlier for Gateway Telephone 200''', the mentioned software should be able to support multiple simultaneous media streams.

The described software relies on known and commonly used techniques in the current state of the art. Those skilled in the art will be able to assemble and write code performing the functions without further detailed instructions.

The security software 430 handles user identification input, e.g. Smart Card input, cryptography, and key management, if used.

Communication Protocol software 440 handles standard IP protocols, such as TCP/IP, UDP, and RTP/RTCP.

The low level communication software 450 can include standard code for Ethernet and USB drivers, and for cable or DSL modems if used. The signal processing software 460 is standard software for voice compression and de-compression ("CODEC"), silence handling, DTMF detection and generation, echo cancellation, packetization, jitter buffer and lost packet handling. Optionally it may also include known software for control of the speaker phone 246, voice generation, or voice recognition, video compression/decompression, FAX and modem modulation, volume control, and tone control.

The management software 470 is a real time operating system, of which there are several commercially available. This may be extended with functions for configuration, maintenance, and storing of text, voice and video messages. Those skilled in the art will be able to assemble and write code for the required functions without further elaboration.

All Gateway Telephones 200 in the telecommunication system 1000 are functionally interchangeable, so every Gateway Telephone 200 in the system could in principle serve as an Intermediary Gateway for incoming calls from the PBDN to PSTN Telephones. The gateway capacity of the network thus increases with each Gateway Telephone 200 added to the system, and is not limited by the availability of pre-installed Network Gateways, as in known systems for IP telephony. Even if only a small portion of the Gateway Telephones 200 in the system 1000 are registered as Intermediary Gateway Telephones, the capacity of a distributed gateway system according to the preferred embodiments of the invention will grow automatically as the size of the system increases.

The high reliability requirements of a PSTN telephone system can not be expected to be fulfilled by an Internet based telephony system, at least not in the near future. A simple PSTN Telephone will work even during power failure, because it receives power via its telephone line 150, while an IP Telephone requires power from a wall outlet.

Local calls to PSTN connected telephones dialed directly on an PSTN line will always be cheaper than local calls initiated on the Internet and passed to the PSTN via a gateway. It is therefore reasonable to assume that users of Gateway Telephones 200 and other IP Telephones 190 will keep their PSTN subscriptions.

Since most telephone users will keep their PSTN line 150 even after buying a Gateway Telephone, the PSTN line 150 required for the Intermediary Gateway functionality of the Gateway Telephone 200 will most often be available. To maximize the functionality for the user, a port 272 for connection of an external PSTN Telephone 160 is included in the Gateway Telephones 200 according to the preferred embodiments of the invention. Normally this Telephone 160 will be used as another voice interface device for initiating or receiving calls with the Gateway Telephone 200. A Gateway Telephone 200 can then, even when the Telephone 160 is used, automatically place outgoing local calls directly over the PSTN line and outgoing long distance calls over the Internet. Incoming calls can also be picked up by the Telephone 160 or by the Gateway Telephone 200 directly, independently of whether the calls come via the PSTN line 150 or the Internet.

If either the Internet or the PSTN is out of order, the Gateway Telephone 200 can detect the fault and select the working network for placing calls, thus giving the user a back-up telephone channel. During a power failure, the port 272 for the Telephone 160 will be automatically connected to the PSTN line 150, e.g. by a relay making a circuit connection 253 between the port 272 for the Telephone 160 and the port 252 for the PSTN line 150 when the Gateway Telephone 200 is without power. The Telephone 160 can then be used for regular PSTN telephony in the same way as before the Gateway Telephone 200 was installed. A user of a Gateway Telephone 200 with a Telephone 160 connected will thus have a very reliable telephone system.

Other advantages, in accordance with embodiments of the invention, will be understood by those skilled in the art, and by use of the invention.

The invention concerns a system for IP telephony using distributed gateways instead of Network Gateways. In accordance with preferred embodiments of the invention, this is achieved by using Gateway Telephones 200 connected both to the PBDN and the PSTN as the backbone of the system. In accordance with embodiments of the invention, however, it does not require that all IP Telephones used in the system must be Gateway Telephones 200.

The scope of the invention shall not be limited by any specific details in the enclosed drawings, nor by any specific term used in the above description of the preferred embodiments of the invention. The Internet is used only as a well known example, and the invention is equally applicable to any other public or private PBDN, such as other IP networks or Asynchronous Transfer Mode ("ATM") networks. The descriptions referring to voice communication are also applicable to facsimile or modem communication and other types of communication carried over telecommunication networks.

Although preferred embodiments of the present invention have been shown and described, it will be appreciated by those skilled in the art that changes may be made in these embodiments without departing from the principle and spirit of the invention, the scope of which is defined in the appended claims and their equivalents.

What is claimed is:

1. A gateway telecommunication device, comprising:
    a first port to connect said device to a circuit switched telecommunication network;
    a second port to connect said device to a packet based telecommunication network;
    means for initiating and receiving calls for a user located in a home or office location where said device is also located;
    means for said user to interface with said device without using a telecommunication network;
    means in said device for executing requests from said user to initiate calls to parties on the circuit switched network or the packet based telecommunication network;
    a single channel gateway means in said device for establishing a path between said first port and said second port inside said device in response to a request from a server on the packet based telecommunication network that is separate from a calling device that a caller at a remote location is using, and the server is acting on behalf of the caller at the remote location; and
    means for responding to said request by connecting said second port directly to said caller at the remote location via the packet based telecommunication network without passing through said server,
    whereby the gateway telecommunication device can serve as part of a distributed gateway system between said packet based telecommunication network and said circuit switched telecommunication network for said caller and whereby the device increases the capacity of said distributed gateway system.

2. A gateway telecommunication device according to claim 1, further comprising a third port to connect a conventional telephone apparatus via said device to said first port.

3. A gateway telecommunication device according to claim 1, further comprising a mechanism to automatically connect said third port directly to said first port in the event of power failure.

4. A gateway telecommunication device according to claim 1, further comprising means for registering at said server the availability of said device to act as a gateway between said first port and said second port.

5. A system for telecommunication utilizing both a circuit switched telecommunication network and a packet based telecommunication network, comprising:
    multiple gateway telecommunication devices each device having
        a first port to connect said device to a circuit switched telecommunication network;
        a second port to connect said device to a packet based telecommunication network;
        means for initiating and receiving calls for a user located in a home or office location where said device is also located;
        means for said user to interface with said device without using a telecommunication network;
        means in said device for executing requests from said user to initiate calls to parties on the circuit switched network or the packet based telecommunication network;
        a single channel gateway means in said device for establishing a path between said first port and said second port inside said device in response to a request from a server on the packet based telecommunication network that is separate from a calling device that a caller at a remote location is using, and the server is acting on behalf of the caller at the remote location; and
        means for responding to said request by connecting said second port directly to said caller at the remote location via the packet based telecommunication network without passing through said server,
    whereby the gateway telecommunication device can serve as part of a distributed gateway system between said packet based telecommunication network and said circuit switched telecommunication network for said caller and whereby the device increases the capacity of said distributed gateway system.

6. A system for telecommunication according to claim 5, further comprising:
    gateway location servers connected to said packet based telecommunication network, said gateway location servers being adapted to receive a request from a first gateway telecommunication device connected to said packet based telecommunication network for telecommunication with a specified telephone apparatus on said circuit switched telecommunication network, and further being programmed to select a second of said gateway telecommunication devices to serve as a gateway between said networks for said requested connection, and to forward said request to said second gateway telecommunication device via said packet based telecommunication network.

7. A system for telecommunication according to claim 6, wherein the packet based telecommunication network comprises the Internet.

8. A system for telecommunication according to claim 6, wherein each of said gateway telecommunication devices includes means for registering with said gateway location servers the availability of said device to act as a gateway between said packet based network and said circuit switched network.

9. A system for telecommunication according to claim 8, wherein each of said registered gateway telecommunication devices includes means for automatically notifying said gateway location servers when its PSTN connection is Off Hook so it temporarily is not available to serve as a gateway between the packet based network and the circuit switched network.

10. A system for telecommunication according to claim 5, wherein the packet based telecommunication network comprises the Internet.

11. A system for telecommunication according to claim 5, further comprising means for registering at said server the availability of said device to act as a gateway between said first port and said second port.

12. A system for telecommunication utilizing both a circuit switched telecommunication network and a packet based telecommunication network, comprising:
    multiple gateway telecommunication devices each device having
        a first port to connect said device to a circuit switched telecommunication network;

a second port to connect said device to a packet based telecommunication network;

means for initiating and receiving calls for a user located in a home or office location where said device is also located;

means for said user to interface with said device without using a telecommunication network;

means in said device for executing requests from said user to initiate calls to parties on the circuit switched network or the packet based telecommunication network; and a single channel gateway means in said device for establishing a path between said first port and said second port inside said device in response to a request from a server on the packet based telecommunication network that is separate from a calling device that a caller at a remote location is using, and the server is acting on behalf of the caller at the remote location; and a gateway location server connected to said packet based telecommunication network having information of the location of said gateway telecommunication devices, said gateway location server being adapted to receive a request from a caller anywhere on said packet based telecommunication network for telecommunication with a specified telephone apparatus on said circuit switched telecommunication network, and further being programmed to select one of said gateway telecommunication devices to serve as a gateway between said networks for said requested connection, and to forward said request to said one gateway telecommunication device via said packet based telecommunication network.

13. A system for telecommunication according to claim 12, wherein the packet based telecommunication network comprises the Internet.

14. A system for telecommunication according to claim 12, wherein each of said gateway telecommunication devices includes means for registering with said gateway location servers the availability of said device to act as a gateway between said packet based network and said circuit switched network.

15. A system for telecommunication according to claim 14, wherein each of said registered gateway telecommunication devices includes means for automatically notifying said gateway location servers when its PSTN connection is Off Hook so it temporarily is not available to serve as a gateway between the packet based network and the circuit switched network.

16. A system for telecommunication according to claim 12, wherein the circuit switched telecommunication network comprises a wireless cellular telecommunication network.

17. A gateway telecommunication device comprising:

a first port to connect said device to a circuit switched telecommunication network;

a second port to connect said device to a packet based telecommunication network;

means for initiating and receiving calls for a user located in a home or office location where said device is also located;

means for said user to interface with said device without using a telecommunication network;

means in said device for executing requests from said user to initiate calls to parties on the circuit switched network or the packet based telecommunication network; and a single channel gateway means in said device for establishing a path between said first port and said second port inside said device in response to a request from a server on the packet based telecommunication network that is separate from a calling device that a caller at a remote location is using, and the server is acting on behalf of the caller at the remote location, for use in a system for telecommunication having a circuit switched telecommunication network, a packet based telecommunication network, a plurality of said gateway telecommunication devices, and a gateway location server connected to said packet based telecommunication network having information of the location of said gateway telecommunication devices, said gateway location server being adapted to receive a request from a caller anywhere on said packet based telecommunication network for telecommunication with a specified telephone apparatus on said circuit switched telecommunication network, and further being programmed to select one of said gateway telecommunication devices to serve as a gateway between said networks for said requested connection, and to forward said request to said one gateway telecommunication device via said packet based telecommunication network, whereby the gateway telecommunication device can serve as part of a distributed gateway system between said packet based telecommunication network and said circuit switched telecommunication network for said caller and whereby the device increases the capacity of said distributed gateway system.

* * * * *

UNITED STATES PATENT AND TRADEMARK OFFICE
CERTIFICATE OF CORRECTION

PATENT NO. : 7,804,815 B1  
APPLICATION NO. : 09/397959  
DATED : September 28, 2010  
INVENTOR(S) : Karl Erik Stahl Page 1 of 1

It is certified that error appears in the above-identified patent and that said Letters Patent is hereby corrected as shown below:

Column 11, line 10, in claim 12, after "network;" delete "and".

Signed and Sealed this
Third Day of May, 2011

David J. Kappos
*Director of the United States Patent and Trademark Office*